US009154340B2

(12) United States Patent
Choi et al.

(10) Patent No.: US 9,154,340 B2
(45) Date of Patent: Oct. 6, 2015

(54) METHOD OF CANCELLING INTER-SUBCARRIER INTERFERENCE IN DISTRIBUTED ANTENNA SYSTEM

(71) Applicants: POSTECH ACADEMY-INDUSTRY FOUNDATION, Gyeongbuk (KR); INDUSTRY-ACADEMIC COOPERATION FOUNDATION, YEUNGNAM UNIVERSITY, Gyeongsangbuk-do (KR)

(72) Inventors: Kwon Hue Choi, Gyeongsangbuk-do (KR); Bong Seok Kim, Gyeongsangbuk-do (KR)

(73) Assignees: POSTECH ACADEMY-INDUSTRY FOUNDATION, Gyeongbuk (KR); INDUSTRY-ACADEMIC COOPERATION FOUNDATION, YEUNGNAM UNIVERSITY, Gyeongsangbuk-do (KR)

( * ) Notice: Subject to any disclaimer, the term of this patent is extended or adjusted under 35 U.S.C. 154(b) by 0 days.

(21) Appl. No.: 14/081,545

(22) Filed: Nov. 15, 2013

(65) Prior Publication Data

US 2014/0140437 A1    May 22, 2014

(30) Foreign Application Priority Data

Nov. 16, 2012  (KR) .................. 10-2012-0130225

(51) Int. Cl.
*H04L 25/03* (2006.01)
*H04L 27/26* (2006.01)

(52) U.S. Cl.
CPC .... *H04L 25/03159* (2013.01); *H04L 25/03821* (2013.01); *H04L 27/265* (2013.01); *H04L 27/2628* (2013.01)

(58) Field of Classification Search
CPC .................. H04L 27/2647; H04B 7/0697
USPC .............................................. 375/346
See application file for complete search history.

(56) References Cited

U.S. PATENT DOCUMENTS

| 7,724,806 B2* | 5/2010 | Franck et al. ................ 375/148 |
| 8,599,941 B2* | 12/2013 | Hamamura .................. 375/260 |
| 2006/0115011 A1 | 6/2006 | Tsuruta et al. |
| 2010/0008216 A1* | 1/2010 | Li et al. ........................ 370/208 |
| 2010/0041350 A1* | 2/2010 | Zhang et al. ................ 455/101 |

OTHER PUBLICATIONS

Zhou, Xiao et al. "Novel Transmit Diversity Scheme for TDS-OFDM System with Frequency-Shift m-Sequence Padding" IEEE Transactions on Broadcasting; vol. 58, No. 2, pp. 317-324, Jun. 2012.
Shin, Oh-Soon et al. "Design of an OFDM Cooperative Space-Time Diversity System" IEEE Transactions on Vehicular Technology, vol. 56, No. 4, pp. 2203-2215, Jul. 2007.

* cited by examiner

*Primary Examiner* — Shuwang Liu
*Assistant Examiner* — Ross Varndell
(74) *Attorney, Agent, or Firm* — Osha Liang LLP

(57) ABSTRACT

Disclosed is a method of cancelling inter-subcarrier interferences in distributed antenna system. A method of cancelling interference performed in a transmitting station may include configuring a least one Alamouti pair by mapping subcarrier to each of input symbols, performing a 2N-point inverse fast Fourier transform (IFFT) on the at least one Alamouti pair, wherein the N is a natural number, and performing a frequency up converting on signals on which the 2N-point IFFT performed. Therefore, the inter-subcarrier interferences can be canceled efficiently.

2 Claims, 5 Drawing Sheets

METHOD OF CANCELLING INTER-SUBCARRIER INTERFERENCE IN DISTRIBUTED ANTENNA SYSTEM

CLAIM FOR PRIORITY

This application claims priority to Korean Patent Application No. 10-2012-0130225 filed on Nov. 16, 2012 in the Korean Intellectual Property Office (KIPO), the entire contents of which are hereby incorporated by reference.

BACKGROUND

1. Technical Field

Example embodiments of the present invention relate in general to a technology for cancelling interference in a wireless communication system, and more specifically, to a method of cancelling inter-subcarrier interference in distributed antenna system, which can efficiently cancel inter-subcarrier interference in distributed antenna system using Alamouti coded orthogonal frequency division multiplexing (OFDM).

2. Related Art

According to rapid advances of wireless communication system, demands on transmitting and receiving a high-speed large amount of data are increasing. For this, a method of installing a plurality of distributed antennas additionally in the conventional cell coverage, and performing cooperative communications between a plurality of transmitters and a plurality of receivers, which are geographically distributed, is being used.

Such the distributed antenna system has an effect of resolving a problem of coverage hole, decreasing transmission power, and enhancing transmission efficiency per bandwidth, and especially a system which makes use of relay nodes connected to a base station through optic cables as distributed antenna has a strong point in high-efficient resource allocation and a cooperative signal transmission between distributed antennas, since the system does not require additional radio resources for relaying and transmission/reception of control signals.

Meanwhile, since circuits processing a large number of subcarriers may be implemented on a single integrated circuit according to advances of semi-conductor technology, it has become possible to convert high-speed data into low-speed parallel data and transmit the converted low-speed parallel data. In addition, since computation has become more simplified according to adopting a Fast Fourier Transform (FFT) signal processing, an Orthogonal Frequency Division Multiplexing (OFDM) is being applied to various commercial wireless or mobile telecommunication systems.

Also, recently, an Alamouti coded OFDM, which obtains transmit antenna gains by using Alamouti codes in distributed antenna system, is being used. In the distributed antenna system, in order to maximize diversity gain, interferences due to frequency errors are required to be reduced.

In a wireless communication system using a time-space code based Alamouti coded OFDM, in order to cancel interferences due to frequency errors between transmit antennas, a conventional method of transferring information on drifts generated due to the frequency error from a receiving part to a transmitting part has been used. Thus, the conventional method has shortcoming of increasing signaling overhead.

Also, since N-point Inverse Fast Fourier Transform (IFFT)/Fast Fourier Transform (FFT) computations have been used conventionally, there has been a problem that effects of residual interference components are large even after cancelling inter-subcarrier interferences, and a method of transmitting null data for resolving the problem has been used. However, the method of transmitting null data has a shortcoming in decreasing a data transmission rate.

SUMMARY

Accordingly, example embodiments of the present invention are provided to substantially obviate one or more problems due to limitations and disadvantages of the related art.

Example embodiments of the present invention provide a method of cancelling inter-subcarrier interferences in distributed antenna system which can efficiently cancel the inter-subcarrier interferences.

In some example embodiments, a method of cancelling interference, performed in a transmitting station, may comprise configuring a least one Alamouti pair by mapping subcarrier to each of input symbols, performing a 2N-point inverse fast Fourier transform (IFFT) on the at least one Alamouti pair, wherein the N is a natural number, and performing a frequency up converting on signals on which the 2N-point IFFT performed.

Here, the at least one Alamouti pair may be configured by using two subcarriers existing in positions of mirror images in reference to a mirror point located in (N/2)th subcarrier or (N/2+1)th subcarrier among N subcarriers, in the configuring at least one Alamouti pair.

Here, the at least one Alamouti pair may be inputted to inputs 1 to N of whole inputs 1 to 2N of the IFFT, 0 may be inputted to inputs N+1 to 2N of the whole inputs 1 to 2N of the IFFT, and the IFFT may be performed, in the performing a 2N-point IFFT.

Also, symbols to which subcarriers 1 to N/2 of subcarriers 1 to N mapped may be inputted to inputs 1 to N/2 of inputs 1 to N of the IFFT, and the Alamouti pair symbols to which subcarriers in positions of mirror images of the subcarriers 1 to N/2 mapped may be inputted to inputs N/2+1 to N of the inputs 1 to N of the IFFT.

In another example embodiments, a method of cancelling interference, performed in a receiving station, may comprise down-converting signal received through a first receive antenna, generating a shifted signal by frequency-shifting the down-converted signal by a specific amount of frequency, and performing a fast Fourier transform (FFT) on the down-converted signal and the shifted signal respectively.

Here, the generating a shifted signal may further comprise obtaining a difference between a carrier frequency of signal received through the first receive antenna and a carrier frequency of signal received through a second receive antenna, and shifting a frequency of the down-converted signal by the obtained difference.

Here, the performing a FFT may further comprise performing 2N-point FFT on the down-converted signal and performing 2N-point FFT on the shifted signal, wherein the N is a natural number.

Here, the method may further comprise performing a diversity combining on the signal derived by performing the 2N-point FFT on the down-converted signal and a signal derived by performing the 2N-point FFT on the shifted signal.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
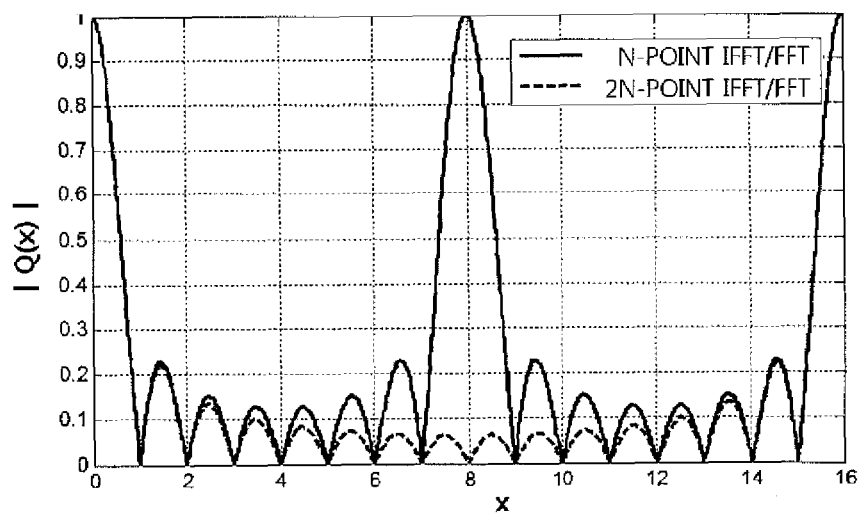
FIG. 1 is a graph to compare interference components of a N-point IFFT/FFT method and a 2N-point IFFT/FFT method.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the accompanying drawings. In describing the invention, to facilitate the entire understanding of the invention, like numbers refer to like elements throughout the description of the figures, and a repetitive description on the same element is not provided.

A method of cancelling inter-subcarrier interference in distributed antenna system according to an example embodiment of the present invention may be applied to a system using Alamouti coded orthogonal frequency division multiplexing (OFDM) in cooperative communication environment performing cooperative communications between distributed base stations and a plurality of transmission/reception points.

Also, the term a 'receiving apparatus' or a 'receiver' in the specification may mean a mobile station (MS), a mobile terminal (MT), a user terminal (UT), a user equipment (UE), a user device, a wireless terminal, an access terminal, a subscriber unit, a subscriber station (SS), a wireless device, a wireless communication device, a wireless transmit/receive unit (WTRU), a mobile node, a mobile and so on.

Also, the term a 'transmitting station, a 'transmitter', or 'point' may mean generally a fixed node or a mobile node communicating with the terminal, and may be referred as a base station, a Node-B, a eNode-B, a base transceiver system (BTS), an access point, a transmission point, a Remote Radio Head (RRH), a Remote Radio Equipment (RRE) and so on.

A method of cancelling interference according to an example embodiment of the present invention is using 2N-point (N is a natural number) IFFT/FFT operations in modulation and demodulation in flat fading channel environment. Transmitting stations may efficiently cancel interference components due to frequency errors between subcarriers by using subcarriers located in positions of mirror images as Alamouti pair differently from the conventional method in that adjacent subcarriers are used as Alamouti pair. That is, in the present invention, the interference components may be canceled only by changing Alamouti symbol pairs in a transmitting station without any complicated synchronization procedures. Meanwhile, in a receiving station, FFT is performed twice in synchronization with each antenna, and data is detected through diversity combining.

FIG. 1 is a graph to comparatively show interference components of a N-point IFFT/FFT method and a 2N-point IFFT/FFT method, and represents comparatively frequency errors and interference components due to frequency errors of the N-point IFFT/FFT method and the 2N-point IFFT/FFT method in the case that the number of subcarriers is assumed to be 8 (that is, N=8).

An interference components Q(x) may be calculated as the following equation 1

$$Q(x) = \frac{\sin(\pi x)}{N \sin\left(\frac{\pi x}{N}\right)} \exp[j\pi(1 - 1/N)x] \qquad \text{[Equation 1]}$$

Here, x may mean sum of frequency error component and distance between subcarriers. As shown in FIG. 1, interference components may have a symmetrical form with a reference of x=8. Also, periods having maximum interference component in the N-point IFFT/FFT method and the 2N-point IFFT/FFT method are respectively N and 2N.

Specifically, in the N-point IFFT/FFT method, an interference component may be minimum at N/2 (x=4), and increases in subcarriers above N/2. On the contrary, in the case of the 2N-point IFFT/FFT method, interference component may decrease even above N/2, and may be rather minimum at N (x=8) at which interference component becomes maximum in the case of the N-point IFFT/FFT method.

As shown in FIG. 1, interference components due to frequency errors may be reduced when the 2N-point IFFT/FFT method is used than when the N-point IFFT/FFT method is used. In the present invention, the 2N-point IFFT/FFT method is used in consideration of the above-mentioned characteristics.

Figure 2A:
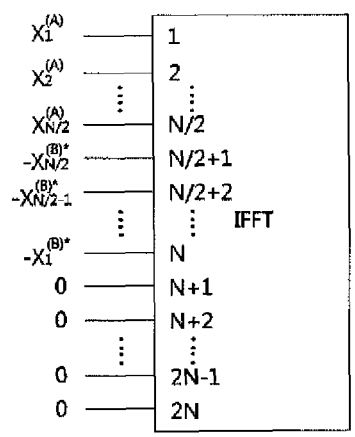
FIG. 2A and FIG. 2B is a conceptual diagram to show a procedure of IFFT on signals to be transmitted through a transmit antenna in a method of cancelling interference according to an example embodiment of the present invention.
Figure 2B:
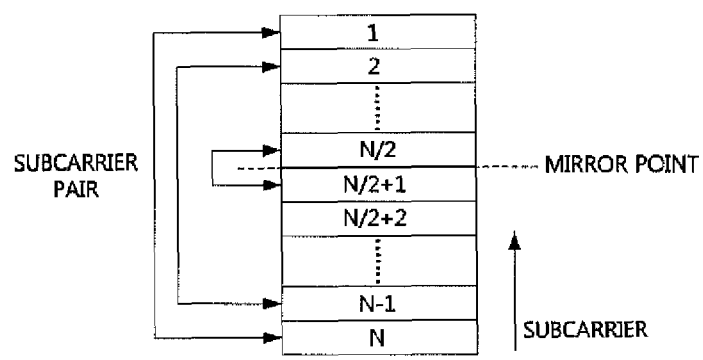

FIGS. 2A and 2B is a conceptual diagram to show a procedure of IFFT on signals to be transmitted through a transmit antenna in a method of cancelling interference according to an example embodiment of the present invention.

FIG. 2A represents an example procedure of IFFT performed in arbitrary transmission points of distributed antenna system, and FIG. 2B represents that pairs of subcarriers for Alamouti pairs in a form of mirror images.

Referring to FIGS. 2A and 2B, since a 2N-point IFFT/FFT method used in an example embodiment of the present invention only for increasing sampling rate twice, demodulation symbols are inputted to inputs 1 to N of whole inputs 1 to 2N of IFFT like a N-point IFFT/FFT method, and 0s are inputted to inputs N+1 to 2N of the whole inputs of the IFFT.

Especially, as shown in FIG. 2A, $X_k^{(A)}$ (k=1, 2, ..., N/2, Here, k means an index of subcarrier) are inputted to inputs 1 to N/2 of the IFFT, $$-X_{N-k+1}^{(B)*}(k = N/2 + 1, N/2 + 2, \ldots, N),$$

symbols of Alamouti pair of $X_k^{(A)}$ are inputted to inputs (N/2)+1 to N of the IFFT in the form of mirror image.

That is, in an example embodiment of the present invention, when total N subcarriers which can be allocated exist as shown in FIG. 2B, a mirror point may be located between N/2 and N/2+1, and Alamouti pairs may be configured by selecting pairs of subcarriers located in mirror images in reference to the mirror point.

For example, in FIG. 2B, Alamouti pairs may comprise a pair of a first subcarrier and a Nth subcarrier, a pair of a second subcarrier and a (N−1)th subcarrier, and so on. Thereby, a receiver can efficiently cancel interference components due to frequency errors through to characteristics of Alamouti code configured as described above without a procedure for complicated frequency synchronization.

Figure 3:
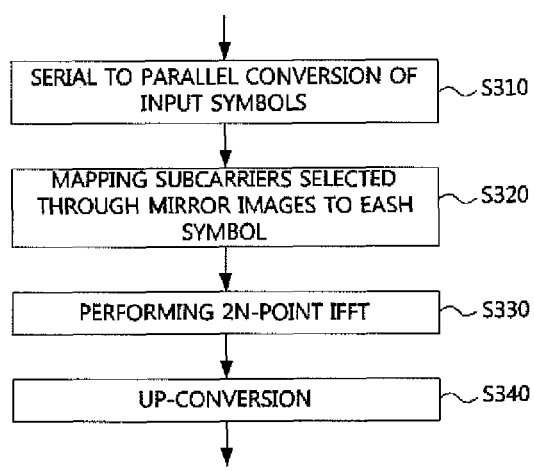
FIG. 3 is a flow chart to show a method of cancelling inter-subcarrier interference according to an example embodiment of the present invention.

FIG. 3 is a flow chart to show a method of cancelling inter-subcarrier interference according to an example embodiment of the present invention, and represents an example procedure of cancelling inter-subcarrier interference performed in an arbitrary point among a plurality of points performing cooperative transmission.

Referring to FIG. 3, modulated serial input symbols with high-speed transmission rate may be provided, and the modulated input symbols may be converted into parallel symbols with low-speed at S310.

Then, as shown in FIG. 2B, Alamouti pair symbols comprising low-speed parallel symbols may be configured by selecting pairs of subcarriers located in positions of mirror images among sets of subcarriers which can be allocated, and mapping them to the converted parallel symbols at S320.

Then, a 2N-point IFFT may be performed on the Alamouti pair symbols at S330. Here, in the 2N-point IFFT, as shown in FIG. 2A, demodulation symbols comprising Alamouti pair are inputted to inputs 1 to N of whole inputs 1 to 2N of the IFFT, and 0s are inputted to inputs N+1 to 2N of the whole inputs of the IFFT.

Then, a frequency up-conversion may be performed on the signal on which the IFFF was performed at S340. Here, the up-converted signal may be provided to a specific antenna through digital-to-analog conversion and/or amplification.

Figure 4:
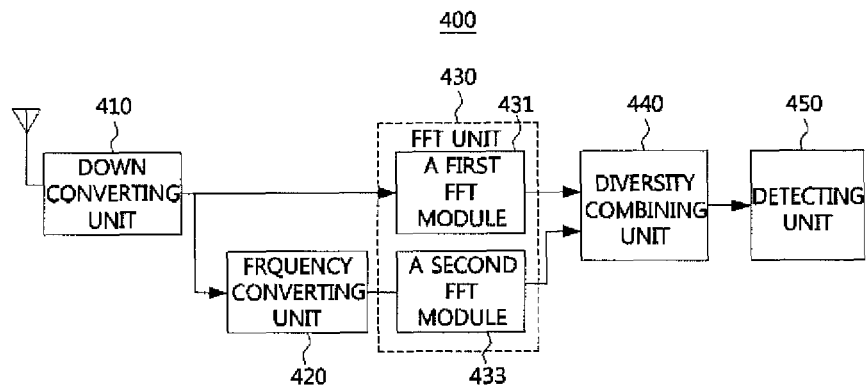
FIG. 4 is a block diagram to explain a constitution and an operation of a receiving apparatus receiving signal transmitted by using a method of cancelling interference according to an example embodiment of the present invention.

FIG. 4 is a block diagram to explain a constitution and an operation of a receiving apparatus receiving signal transmitted by using a method of cancelling interference according to an example embodiment of the present invention.

Referring to FIG. 4, a receiving apparatus 400 may include a down converting unit 410, a frequency converting unit 420, a FFT unit 430, a diversity combining unit 440, and a detecting unit 450.

First, the down converting unit 410 may down-convert signals received through a receive antenna A into signals of which carrier frequency is $f_c^{(A)}$.

The frequency converting unit 420 may obtain a difference between a carrier frequency $f_c^{(A)}$ of signals provided from the down converting unit 410 and a carrier frequency $f_c^{(B)}$ of signals of a receive antenna B, and may synchronize received signals to frequencies of each receive antenna by shifting a frequency of signals provided from the down converting unit 410 by the difference (that is, $f_c^{(B)} - f_c^{(A)}$).

The FFT unit 430 may comprise a first FFT module 431 and a second FFT module 433. The first FFT module 431 may perform a 2N-point FFT on signals provided from the down converting unit 410, and the second FFT module 433 may perform a 2N-point FFT on shifted signals which are provided from the frequency converting unit 420.

The diversity combining unit 440 may perform diversity combining on symbols provided from the first FFT module 431 and symbols provided from the second FFT module 433.

The detecting unit 450 may receive diversity combined symbols from the diversity combining unit 440, and perform detections on the provided symbols.

Figure 5:
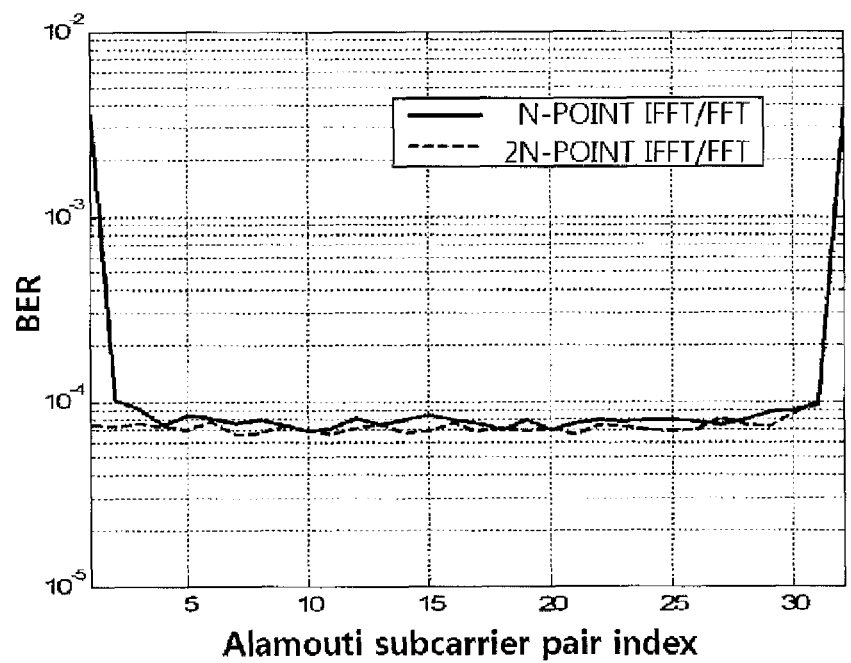
FIG. 5 is a graph to represent a bit error rate (BER) performance according to Alamouti pair index of a N-point IFFT/FFT method and a 2N-point IFFT/FFT method.

FIG. 5 is a graph to represent a bit error rate (BER) performance according to Alamouti pair index of a N-point IFFT/FFT method and a 2N-point IFFT/FFT method.

In FIG. 5, Eb/N0 is supposed to be 20 dB, and N is supposed to be 64. In addition, a Binary Phase Shift Keying (BPSI) is supposed as a modulation manner.

As shown in FIG. 5, a critical performance degradation in indexes 0 and 32 of the Alamouti pairs may occur in the N-point IFFT/FFT method, however, a performance degradation may occur only in a position of N/2 in the 2-point IFFT/FFT method according to the present invention.

That is, the 2N-point IFFT/FFT method adopted in the method of cancelling interference according to an example embodiment of the present invention may have generally enhanced performance as compared to the N-point IFFT/FFT method. Also, since the number of null subcarriers used for preventing critical performance degradation is small, there may be a merit that a decrease of data rate does not happen.

Figure 6:
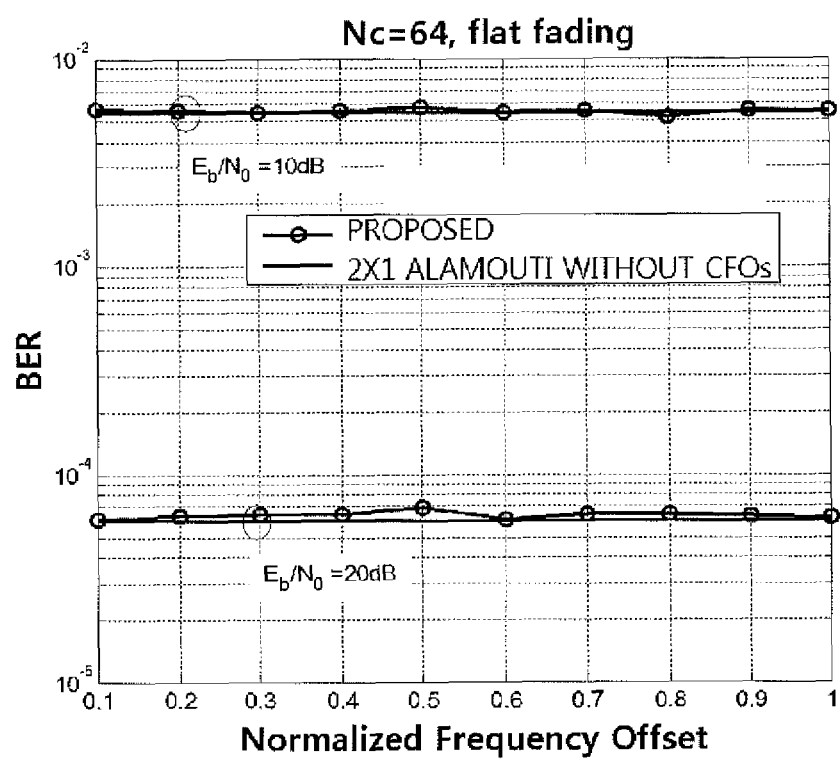
FIG. 6 is a graph to represent a bit error rate (BER) performance due to frequency error according to an example embodiment of the present invention.

FIG. 6 is a graph to represent a bit error rate (BER) performance due to frequency error according to an example embodiment of the present invention, and represent bit error rate (BER) performances due to frequency error for both the case that Eb/N0=10 dB and the case that Eb/N0=20 dB, by comparing to the conventional method (2×1 Alamouti without Carrier Frequency Offsets), when N=64, Binary Phase Shift Keying (BPSK) is used, and a flat fading environment is assumed.

As shown in FIG. 6, a performance degradation does not occur in a method of cancelling interference according to an example embodiment of the present invention, even in the case that frequency error increases.

Figure 7:
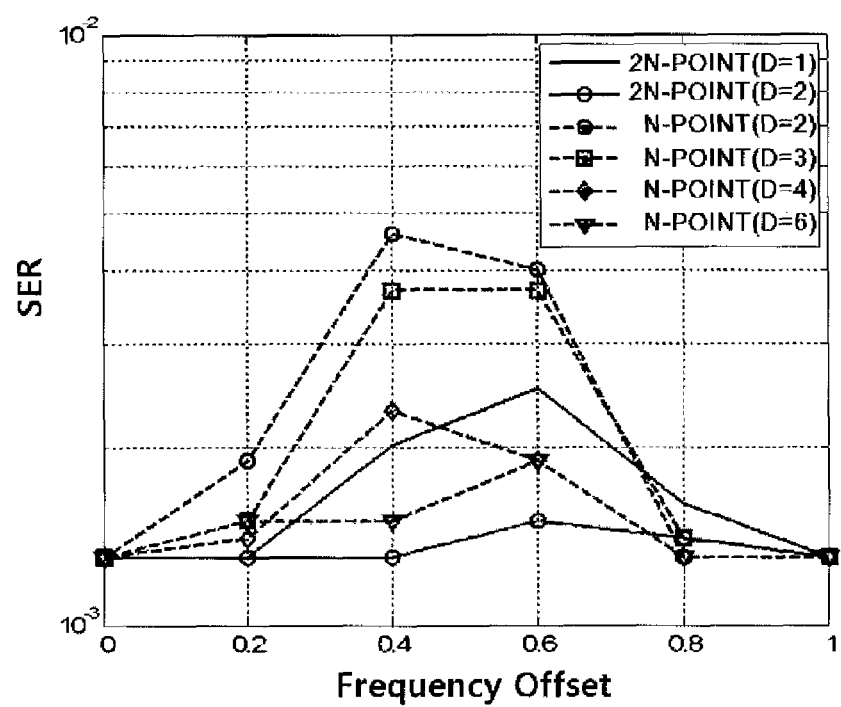
FIG. 7 is a graph to represent a performance due to frequency error in a method of cancelling interference according to an example embodiment of the present invention.

FIG. 7 is a graph to represent a performance due to frequency error in a method of cancelling interference according to an example embodiment of the present invention, and shows a comparison result of performances of the N-point IFFT/FFT method and the 2N-point IFFT/FFT method which is represented as symbol error rate (SER).

In FIG. 7, 16 Quadrature Amplitude Modulation (16QAM) is assumed for a modulation manner. Also, Eb/N0 is supposed to be 20 dB, and N is supposed to be 64.

As shown in FIG. 7, the number of null subcarriers should be configured to 6 for preventing performance degradation in the case of the N-point IFFT/FFT method. However, the 2N-point IFFT/FFT method may have a better performance than the N-point IFFT/FFT method in which D is configured to 2.

For example, when data rates $$\left(\frac{N-2D}{N}\right)$$

of the two method, the N-point IFFT/FFT method (D=6) and the 2N-point IFFT/FFT method (D=2) are compared, the data rate of the 2N-point IFFT/FFT method is 0.9375 though the data rate of the N-point IFFT/FFT method is 0.8125.

According to a method of cancelling inter-subcarrier interference of distributed antenna system as described above, in a cooperative communication system adopting distributed antenna system or relays using Alamouti coded OFDM, Alamouti pair may be configured by using subcarriers located in positions of mirror images among sets of subcarriers which can be allocated, and a 2N-point IFFT/FFT may be performed.

Therefore, interferences due to frequency error between subcarriers may be easily canceled by configuring Alamouti pair comprising subcarriers having symmetrical positions in a transmitting part. In addition, interference components due to frequency errors may be more efficiently through 2N-point IFFT/FFT operation in a transmitting part and a receiving part.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of cancelling interference, performed in a transmitting station, comprising:
   configuring at least one Alamouti pair by mapping a subcarrier to each input symbol;
   performing a 2N-point inverse fast Fourier transform (IFFT) on the at least one Alamouti pair, wherein N is a natural number; and
   performing a frequency up converting on signals on which the 2N-point IFFT performed,
   wherein the at least one Alamouti pair is inputted to inputs 1 to N of whole inputs 1 to 2N of the 2N-point IFFT, 0 is inputted to inputs N+1 to 2N of the inputs 1 to 2N of the 2N-point IFF, and the 2N-point IFFT is performed, in the performing of the 2N-point IFFT,
   wherein the at least one Alamouti pair is configured by using two subcarriers existing in positions of mirror images in reference to a mirror point located in (N/2)th subcarrier or (N/2+1)th subcarrier among N subcarriers, in the configuring at least one Alamouti pair.

2. The method of claim 1, wherein symbols to which subcarriers 1 to N/2 of subcarriers 1 to N mapped are inputted to inputs 1 to N/2 of inputs 1 to N of the 2N-point IFFT, and the Alamouti pair symbols to which subcarriers in positions of mirror images of the subcarriers 1 to N/2 mapped are inputted to inputs N/2+1 to N of the inputs 1 to N of the 2N-point IFFT.

* * * * *